Dec. 6, 1955   C. N. KIMBERLIN, JR   2,726,216
PROCESS FOR THE MANUFACTURE OF SILICA HYDROSOLS
Filed July 31, 1951
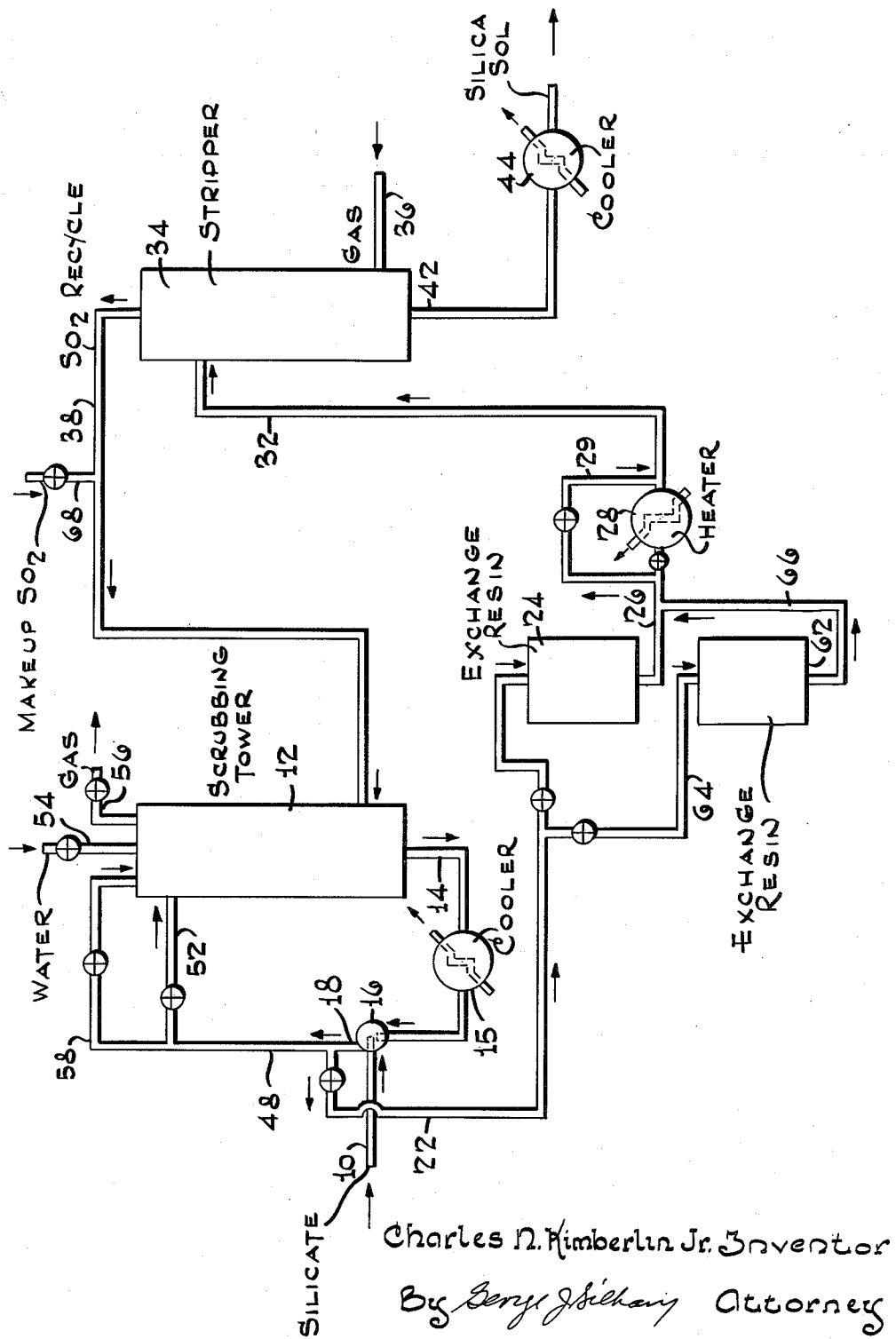
Charles N. Kimberlin Jr. Inventor
By George J. Silvany Attorney United States Patent Office 2,726,216
Patented Dec. 6, 1955

2,726,216

PROCESS FOR THE MANUFACTURE OF SILICA HYDROSOLS

Charles N. Kimberlin, Jr., Baton Rouge, La., assignor to Esso Research and Engineering Company, a corporation of Delaware Application July 31, 1951, Serial No. 239,612

7 Claims. (Cl. 252—313)

This invention relates to an improved process for the preparation of substantially pure hydrosols by using cation exchange materials.

It is known to produce silica hydrosols by passing dilute sodium silicate solutions in contact with cation exchange materials. In the prior art processes, the useful life of the cation exchange material is reduced after some use, particularly when producing hydrosols of above about 3% silica content. In some cases there may be a deposition of silica gel in or on the surfaces of the exchange material and this results in a loss of exchange capacity and/or exchange rate.

The rate of polymerization of silica is influenced to a great extent by the pH of the environment. In particular, the polymerization of silica is very fast in the pH region of about 5 to 8.5. Now in the prior art process where alkaline sodium silicate solution is percolated through an acid regenerated cation exchange resin to produce an acidic silica hydrosol, it is believed that the liquid material passes rather slowly through this critical pH region in which the polymerization of silica is rapid. It is believed that this is one of the reasons for the deposition of silica on the exchange resin and the loss of exchange capacity when producing higher concentration silica hydrosols of above about 3% silica content by the prior art process. The present invention avoids this difficulty by passing rapidly through this critical pH region in a separate mixing zone outside of the resin bed.

According to the present invention sodium silicate is mixed in the absence of cation exchange material with an acid to form a silica hydrosol and the entire acid treated mixture containing the silica hydrosol is contacted with a cation exchange material to remove soda or sodium ions and to produce a higher concentration of substantially pure silica hydrosol than has been heretofore possible without depositing silica gel on the exchange material.

Silica deposition on the exchange resin or other exchange material in the manufacture of higher concentration silica hydrosols is avoided in the present invention by first actually forming the acid silica hydrosol in the absence of the cation exchange material by mixing sodium silicate with an acid. In this manner the pH of the silicious material in subsequent contact with the resin or other exchange material can at all times be below the critical range where rapid polymerization of silica hydrosol to gel may occur. One of the preferred acids is sulfurous acid, or sulfur dioxide which was selected because it has about the desired degree of acidity and it can be removed from the finished silica hydrosol and recovered for re-use. However, other acids may be used.

More particularly according to this invention substantially pure silica hydrosols are made by mixing sodium silicate or other alkali metal silicate or alkaline silica hydrosols with an excess of acid such as sulfurous acid or other acid to form a silica hydrosol containing an excess of acid as well as sodium sulfite and/or sodium bisulfite when sulfurous acid is used. The entire acid treated mixture containing the silica hydrosol is then contacted with or percolated through an acid regenerated cation exchange resin or other cation exchange material in order to effect essentially complete removal of the sodium or other alkali metal ion from the mixture. In the resin contacting zone the sodium sulfite and/or sodium bisulfite is decomposed by absorption of the sodium by the resin and liberation of the sulfurous acid to produce an acid silica hydrosol containing only sulfurous acid.

The silica hydrosol withdrawn from the cation exchange material zone is then introduced into a distilling zone or other separation zone where sulfur dioxide is distilled overhead or removed and recovered for reuse in the process and the purified acid silica hydrosol, freed of sulfurous acid, is recovered as a bottom stream. Instead of distilling the silica hydrosol from the exchange resin zone, the sulfur dioxide may be removed from the acid silica hydrosol by blowing with air or inert gas such as natural gas in a stripping zone and then recovering the sulfur dioxide as sulfurous acid by scrubbing with water or as $SO_2$ by adsorption with an adsorbent such as charcoal. If it is desired to minimize the temperature to which the silica hydrosol is subjected in the distillation zone, the distillation may be carried out under vacuum or subatmospheric pressures.

In the process of this invention, it is essential that the mixture of sodium silicate and acid be on the acid side and that there is an excess of acid present above that required for neutralization of the sodium silicate. Preferably the pH of the acid mixture of sodium silicate should be between about 2 and 5, preferably below 4.

In the drawing, the figure represents one form of apparatus adapted to carry out one form of the present invention.

Referring now to the drawing, the reference character 10 represents a line through which a sodium silicate solution or other alkali metal silicate solution or an alkaline silica hydrosol is passed. An alkaline silica hydrosol may be obtained by a partial removal of soda from a sodium silicate solution by any of several methods such as by dialysis or by treatment with an acid regenerated cation exchanger in insufficient amount to remove all of the soda or by treatment with a cation exchange resin in the ammonium cycle. In the last case the ammonia may be removed from the alkaline sol by distillation or by stripping with a gas provided that the alkaline sol still contains sufficient soda to act as a stabilizer by maintaining the pH above about 9.5 after removal of the ammonia. However, it is entirely satisfactory to the present process to employ sodium silicate solutions without any prior partial removal of soda. Solutions of the commercial water glasses, such as that having a composition represented by the formula $Na_2O \cdot 3.25SiO_2$, are suitable.

The silicate or sol solution passing through line 10 is rapidly mixed with a sulfurous acid mixture containing silica hydrosol and withdrawn from the bottom portion of scrubbing tower 12 through line 14 and cooler 15. The rapid and thorough mixing is obtained by pump 16 or any other suitable means. Pump 16 may be a centrifugal pump in which the impeller causes rapid mixing of the sodium silicate solution from line 10 with the sulfurous mixture from line 14. In place of mixing within the pump the mixing may be brought about in line 18 by means of suitable restrictions such as Venturi orifices. The temperature in the mixing zone should be maintained below about 120° F., preferably below about 100° F.

A part of the resulting mixture is passed from line 18 through line 22 and into cation exchange material or resin zone 24 where the mixture is contacted with a granular acid regenerated cation exchange resin or other material arranged as a substantially stationary vertical column. The flow of the mixture in line 22 may be flowed downward or upward through zone 24. The rest of the mixture from line 18 is passed to scrubbing tower 12 as will be presently described. The mixture passing through line 22 comprises an acid mixture of silica hydrosol formed by treating the sodium silicate or alkaline silica hydrosol with an excess of acid and this entire mixture is passed through the cation exchange material zone 24.

In the exchange resin zone 24, sodium or other alkali metal ions are removed and the effluent from the zone 24 is a substantially pure silica hydrosol containing sulfurous acid. The effluent from the exchange resin zone 24 passes through line 26 and heater 28 where the acid solution of the silica hydrosol is heated to a temperature of about 120–170° F. and the heated solution is then passed through line 32 and introduced into the upper portion of a stripping tower 34 which is maintained at substantially the same temperature. Air or inert gas such as natural gas is introduced into the lower portion of the stripping tower 34 through line 36 to remove sulfur dioxide from the silica hydrosol and this sulfur dioxide is taken overhead through line 38 and introduced into the bottom portion of the scrubbing tower 12 referred to above.

Particularly when producing higher concentration hydrosols, of say above 8% silica content, it may be desired to avoid heating of the hydrosol in order to minimize the degree of polymerization of the silica. In this case the hydrosol in line 26 by-passes heater 28 via line 29 and the heat required to vaporize the sulfur dioxide from the hydrosol is supplied by heating the stripping gas entering stripper 34 via line 36. In this manner the stripping of the sulfur dioxide may be accomplished while maintaining the temperature of the hydrosol below about 120° F.

The liquid withdrawn from the bottom of the stripping tower 34 is passed through line 42 and cooler 44 and is then passed to storage or is used in any other manner desired. Cooler 44 may be omitted if desired, particularly if it is planned to convert the silica hydrosol product into a silica hydrogel for use in the latter form. The liquid withdrawn from the bottom of the stripping tower 34 comprise substantially pure silica hydrosol having a concentration of silica of about 3 to 15% by weight and containing less than about 0.1% by weight $Na_2O$ on a dry basis.

Returning now to the scrubbing tower 12, the liquid withdrawn through line 14 from the bottom of scrubbing tower 12 which contains silica hydrosol, sodium sulfite and/or sodium bisulfite, and excess sulfurous acid and may have a pH of about 1 to 3 is rapidly mixed in pump 16 or other mixing device as above described with sodium silicate solution from line 10. The excess sulfurous acid from line 14 reacts with the sodium silicate from line 10 and converts it into silica hydrosol and sodium sulfite and/or sodium bisulfite. A part of the resulting mixture from line 18 which contains silica hydrosol and sodium sulfite and/or bisulfite and which may still contain some unneutralized free sulfurous acid and which may have a pH of about 2 to 5 is withdrawn through line 22 into ion exchange zone as above described. The remainder of the mixture from line 18 is passed upwardly through line 48 and line 52 into the upper portion of the scrubbing tower for use as a liquid to scrub out $SO_2$ introduced into the bottom of scrubbing tower by means of line 38. It is preferred to recycle this solution through line 52 into the upper portion of the scrubbing tower 12 and to introduce makeup water into the top portion of the scrubbing tower through line 54 to more completely recover sulfur dioxide from the gas passing upwardly through the scrubbing tower. Gas substantially free of sulfur dioxide is withdrawn from the top of the scrubbing tower 12 through line 56.

Instead of passing a part of the mixture from line 18 through line 48 valves in lines 52 and 58 are closed and all of the mixture from line 18 may be passed through line 22 to exchange material vessel 24 and in this case water is used as the scrubbing liquid via line 54 in scrubbing tower 12 and line 14 withdraws a sulfurous acid solution from the bottom of scrubbing tower 12. This acid solution is used for admixture with sodium silicate or other alkali metal silicate introduced into mixing zone 16 through line 10. However, the process as described in connection with the drawing is the preferred embodiment.

Instead of introducing the recycle stream through line 52 into the upper portion of scrubbing tower 12, all or part of the recycle stream may be passed through line 58 and introduced into the top portion of the scrubbing tower 12 to assist in the removal of sulfur dioxide from the gas in scrubbing tower 12.

In actual practice more than one vessel 24 containing cation exchange resin or other exchange material will be used so that one bed of exchange material will be on the regeneration step while another or other beds of exchange material are in the exchange step or washing steps. Another vessel containing cation exchange material is shown at 62 having an inlet line 64 and an outlet line 66 but it will be understood that any number of cation exchange material beds may be used.

Makeup sulfur dioxide may be introduced into line 38 by 68.

Instead of using stripping zone 34, the effluent from the cation exchange material bed 24 may be passed to a distillation zone to distill overhead the sulfur dioxide and recover it for reuse while withdrawing purified acid silica hydrosol free of sulfurous acid as a bottoms stream. This distillation can be carried out under subatmospheric pressures to minimize the temperature during distillation. Instead of recovering the sulfur dioxide by scrubbing with water, it may be adsorbed with an adsorbent such as charcoal and then recovered for reuse.

As the cation exchange material there is preferably used a resin of the acid regenerated cation type. Such cation exchange resins are available as commercial products. The exchange resins are obtained by condensing aldehydes such as formaldehyde with certain phenolsulfonic acids or the like. Other exchange materials which may be used are sulfuric acid treated coal or wood or waste petroleum sludge or lignite or the like. Also the sulfonated polystyrene type exchange resin may be used. These exchange materials are treated with an acid such as sulfuric acid or hydrochloric acid to put them in the hydrogen cycle for use in removing cations or sodium ions in this particular case. Exchange resins of this type are sold by Resinous Products and Chemical Company under the name of Amberlite.

After the cation exchange material has been used for some time the exchange capacity decreases due to the accumulation of sodium ions thereon and it is then necessary to regenerate the exchange material. It is necessary to regenerate whenever the sodium content of the effluent from the resin bed exceeds that desired in the final hydrosol product. This may be determined by various instrumental means which depend upon the electrical conductivity, pH, or other property of the hydrosol effluent from the exchange zone. However, for practical purposes it is usually preferred to predetermine the capacity of the particular exchange resin being used for soda removal. This is best done in a small experimental exchange resin bed to which is fed silica hydrosol having a composition the same as that in line 22. The effluent from the experimental bed is collected in increments which are separately analyzed for soda. The data thus obtained may be used to calculate the total volume of hydrosol that may be processed in exchange resin bed 24 per exchange step to obtain an essentially soda free hydrosol.

Usually about 10% less than this volume is processed per exchange cycle in order to allow a reasonable safety factor against sodium break through into the hydrosol product. This volume of hydrosol that may be processed in exchange resin bed 24 per exchange cycle is, of course, dependent upon several factors such as (1) the nature or exchange capacity of the particular resin being employed, (2) the concentration of the particular silica hydrosol being processed, and (3) the soda to silica ratio in the sodium silicate entering the process through line 10. After percolation of the required volume of hydrosol through exchange resin bed 24, the hydrosol remaining in the bed is first displaced with water and the bed rinsed with water preparatory to regeneration. Only about 1 to 2 volumes of water per volume of resin are required for displacing the hydrosol and rinsing the resin bed.

The exchange resin bed is then regenerated with an acid such as sulfuric acid or hydrochloric acid to replace the alkali metal ions on the resin with hydrogen ions with the formation of sodium sulfate or sodium chloride depending on the acid used in the regeneration. The regenerating acid may be conveniently used as a solution having a concentration of 5 to 10%. The amount of regenerating acid used per regeneration step may be related to the amount of soda removed from the hydrosol by the resin during the exchange cycle. In general, a considerable excess of regenerating acid over that stoichiometrically equivalent to the soda is required in order to obtain efficient regeneration; thus the total amount of acid used in the regeneration cycle may be 125% to 200% of the stoichiometric equivalent of the soda deposited upon the resin during the exchange cycle. After regeneration the bed of exchange material is washed with water until the effluent tests free of sulfate ion or chloride ion depending on the type of acid used. Two to five volumes of water per volume of resin may be used for this wash. The cation exchange material is then ready for another cation exchange operation.

The concentration and rate of flow of sodium silicate solution in line 10 and the rate of flow of water in line 54 are co-adjusted to give the desired concentration of silica in the silica hydrosol within the range of about 30 to 150 grams of silica per liter of hydrosol. For example, if it is desired to produce a hydrosol containing about 100 grams of silica per liter there would be introduced into the system by line 10 a solution of $Na_2O \cdot 3.25SiO_2$ of about 1.10 sp. gr. in which case no water would be introduced into the system by line 54, or there would be introduced by line 10 a sodium silicate ($Na_2O \cdot 3.25SiO_2$) solution of about 1.2 sp. gr. in which case an equal volume of water would be introduced into the system by line 54. Thus it is readily apparent that for the production of a hydrosol containing 100 grams of silica per liter the concentration of the sodium silicate solution may vary over a wide range and be compensated for by the rate of flow of water in line 54; the same is, of course, true for the production of hydrosols of other silica contents.

Furthermore, the rate of flow of sulfur dioxide entering the bottom of tower 12 by line 38 and the rate of flow and concentration of sodium silicate in line 10 are so co-adjusted that the sulfur dioxide is in stoichiometric excess of the sodium of the sodium silicate. In this case for making calculations of stoichiometric equivalence the sulfur dioxide should be considered as a monobasic acid. The excess of sulfur dioxide over that calculated stoichiometrically need be only about 5 to 10%, although a greater excess may be used. For example, when using a sodium silicate solution having a soda to silica ratio represented by the formula $Na_2O \cdot 3.25SiO_2$ about 0.7 lb. of sulfur dioxide per pound of silica is required, although a larger amount of sulfur dioxide may be employed if desired.

In order to obtain efficient scrubbing of the sulfur dioxide it is desirable to maintain the concentration of free or uncombined sulfur dioxide or sulfurous acid in the scrubbing liquid in tower 12 well below its saturation value. This may be accomplished by operating scrubbing tower 12 with a relatively high ratio of recycle of hydrosol, i. e., the ratio of the rate of flow of the recycled hydrosol in line 48 to the rate of flow of hydrosol in line 22 to the ion exchange zone 24. This ratio may be about 2/1 to 10/1, preferably about 5/1. Thus the hydrosol withdrawn from the bottom of tower 12 by line 14 which is relatively rich in uncombined sulfur dioxide is mixed in mixing zone 16 with sodium silicate which reacts with most of the uncombined sulfur dioxide and restores the capacity of the liquid for dissolving more sulfur dioxide when recycled to the tower 12 by line 48.

The rate of flow of the silica hydrosol through the bed of ion exchange resin 24 may vary between about 0.1 to 1 gallon per minute per cubic foot of resin, preferably about 0.35 gallon per minute per cubic foot of resin. This rate of flow will depend somewhat upon the particular exchange resin material employed, since some of the available resins permit more rapid exchange than others.

Instead of using sulfurous acid or sulfur dioxide I may use any other volatile acid which is sufficiently acidic to give the desired pH of the hydrosol and which can be distilled overhead from an aqueous solution. Also, instead of using the sulfurous acid, I may use acids such as acetic acids, propionic acid, or chloroacetic acid which may be recovered from the acid silica hydrosol by solvent extraction with a solvent such as chloroform or a hydrocarbon oil.

The silica hydrosol may be allowed to gel and the silica gel may be used as such or the silica hydrosol may be mixed with alumina hydrosol in the preparation of catalysts such as cracking catalysts. The silica hydrosol and alumina hydrosol may be mixed in any desired proportion from 10 to 90% of silica and the rest alumina and the resulting hydrosol mixture may be gelled and dried or spray dried to form spherical particles. The catalyst may be in the form of granules, powder or spherical particles. The silica hydrosol or gel made therefrom may be impregnated with a large variety of other catalytic agents other than alumina to produce useful catalysts. For example, impregnation with magnesia leads to a cracking catalyst of another type, or the addition of nickel, platinum or molybdenum oxide leads to hydrogenation or reforming catalysts. The silica hydrosol may also be employed as an impregnating agent to add small amounts of silica to other catalysts or catalysts bases; for example, treatment of alumina with sufficient silica hydrosol to deposit 0.5 to 5% silica improves the alumina for use as a reforming catalyst base. The silica hydrosol may also be employed as an impregnating agent to add silica to such materials as fabrics or paper. The silica hydrosol may also serve as a source of very pure silica for the production of silica gel base greases.

The silica gel produced from the silica hydrosol made by the present process needs no water washing to remove impurities or water soluble material.

By maintaining the hydrosol solution acid during the resin exchange step, it is possible to obtain a substantially pure silica hydrosol containing up to about 15% $SiO_2$ by weight and as little as about 10 parts per million of soda by weight without depositing a detectable amount of silica on the exchange resin or without imparing the resins usefulness for further exchange after regeneration with acid.

Into a mixing zone were introduced 3250 parts by weight of water containing a trace of bromophenol blue indicator. There were then added in alternate increments 322 parts by weight of sulfur dioxide and 2430 parts by weight of sodium silicate ($Na_2O \cdot 3.25SiO_2$) solution of 1.21 specific gravity. The purpose of the bromophenol blue indicator was to insure that at no time was the pH of the mixture allowed to rise above about 3.5. The resulting mixture was a clear hydrosol or silica containing sodium sulfite and/or sodium bisulfite and an excess of uncombined sulfur dioxide or sulfurous acid. This silica hydrosol has percolated through a bed of Amberlite IR-120 exchange resin which had previously been acid regenerated and water washed. The percolation was carried out at room temperature, about 80° F., at a flow rate of about 0.35 gallon of hydrosol per minute per cubic foot of resin and with a total flow of about 13.5 gallons of hydrosol per cubic foot of resin. The liquid product was a substantially sodium free silica hydrosol containing sulfur dioxide from which the sulfur dioxide was removed in two ways, viz., (1) a part of the sulfur dioxide-containing hydrosol was heated rapidly to boiling, boiled for 1 minute, and rapidly cooled to prevent gelling and (2) a second portion of the sulfur dioxide-containing silica hydrosol was heated to about 150° F., blown for 5 minutes with natural gas and cooled to prevent gelling. The resulting hydrosol freed of sulfur dioxide by either method analyzed 7.4% $SiO_2$ by weight and 0.0005% $Na_2O$ by weight. The Amberlite IR-120 exchange resin bed was (1) rinsed with water using about 2 volumes of water per volume of resin, (2) regenerated with 5% sulfuric acid using a total flow of about 2.5 volumes of 5% sulfuric acid per volume of resin and a flow rate of about 0.7 gallon per minute per cubic foot of resin, and (3) finally washed with water using a total flow of about 5 volumes of water per volume of resin. The resin was now ready for re-use in treating more silica hydrosol.

It has been possible to prepare sodium-free 7% and 10% silica hydrosols in this manner repeatedly re-using the same exchange resin bed with acid regeneration without loss in cation exchange resin capacity or silica gel deposition on the resin.

With silica hydrosols of higher concentration, above about 10%, sulfur dioxide tends to come out of solution during the percolation step with the formation of gas bubbles in the exchange resin bed thus causing some loss of efficiency in the percolation. This may be avoided by conducting the operation under superatmospheric pressure.

In this process sulfur dioxide acts as a mono-basic acid, so that a minimum of about 0.7 lb. of sulfur dioxide is required per pound of silica when using a sodium silicate of ratio $Na_2O \cdot 3.25SiO_2$. The sulfur dioxide is recovered for re-use and this can be done very cheaply by integrating the recovery system with the initial silica hydrosol production step. Using the crude silica hydrosol passing through line 52 or 58 as at least part of the scrubbing medium will insure adequate solvent capacity for the sulfur dioxide in the scrubbing step in tower 12.

What is claimed is:

1. A process for the production of silica hydrosol, which comprises mixing an alkaline silica-containing solution with sulfurous acid to make an acid mixture containing silica hydrosol and having a pH below about 5.0, passing the resulting acid mixture in contact with cation exchange material to remove alkali metal ions from the mixture, recovering sulfurous acid-containing silica hydrosol from said cation exchange material contacting step, then volatilizing sulfurous acid from the silica hydrosol to recover sulfurous acid for reuse in the process.

2. A process for the production of silica hydrosol which comprises mixing an aqueous sodium silicate solution with a sufficient amount of sulfurous acid in a mixing zone to make an acid silica hydrosol containing a sodium salt of the acid and having a pH below about 5.0, passing the resulting mixture through a bed of cation exchange resin to remove sodium ions from the mixture and to regenerate sulfurous acid from the sodium salt, withdrawing silica hydrosol solution containing sulfurous acid with said bed of exchange resin and passing it to a recovery zone, removing and recovering $SO_2$ as a gas from the silica hydrosol solution in said recovery zone, recycling the recovered $SO_2$ to said mixing zone to provide sulfurous acid therein and withdrawing substantially pure silica hydrosol from said recovery zone.

3. A process for the production of silica hydrosol which comprises mixing an aqueous alkali metal silicate solution with a sufficient amount of sulfurous acid to make an acid silica hydrosol solution containing an alkali metal salt of the sulfurous acid and having a pH below about 5.0, passing the resulting mixture in contact with cation exchange material to remove alkali metal ions from the mixture and to regenerate sulfurous acid from the alkali metal salt, withdrawing the sulfurous acid-containing silica hydrosol solution from the cation exchange material and passing it to a recovery zone, volatilizing $SO_2$ from the sulfurous acid in the silica hydrosol solution in said recovery zone, recycling the recovered $SO_2$ for admixture with additional alkali metal silicate solution in said first mixing step and withdrawing substantially pure silica hydrosol from said recovery zone.

4. A process for the production of silica hydrosol which comprises mixing an alkali metal silicate with a silica hydrosol solution containing sulfurous acid to form a liquid mixture having a pH below about 5.0, passing part of the liquid mixture in contact with a cation exchange material to remove alkali metal ions from the mixture and to form a silica hydrosol solution containing sulfurous acid, removing sulfurous acid as $SO_2$ from the silica hydrosol to produce a substantially pure silica hydrosol, introducing the removed $SO_2$ into the bottom portion of a scrubbing zone, introducing the rest of the liquid mixture mentioned above into the upper portion of said scrubbing zone as a scrubbing liquid for recovery of said liberated $SO_2$, and withdrawing liquid from the bottom of said scrubbing zone, said liquid comprising silica hydrosol containing sulfurous acid which is used for mixing with the alkali metal silicate in the first step above mentioned.

5. A process for the production of silica hydrosol which comprises passing a portion of an acid liquid mixture having a pH below about 5.0 and containing silica ions, alkali metal ions and $SO_2$ ions in contact with a cation exchange material to remove alkali metal ions from the mixture and to form a silica hydrosol containing sulfurous acid, removing $SO_2$ as a gas from the silica hydrosol to produce a substantially pure silica hydrosol, introducing the removed $SO_2$ gas into the bottom portion of a scrubbing zone, introducing the rest of the liquid mixture mentioned above into the upper portion of said scrubbing zone as a scrubbing liquid to recover $SO_2$, and withdrawing liquid from the bottom of said scrubbing zone, said withdrawn liquid comprising an acid solution containing silica ions, alkali metal ions and $SO_2$ ions which is admixed with alkali metal silicate to provide said first-mentioned acid liquid mixture.

6. A process for the production of silica hydrosol which comprises passing an acid liquid mixture having a pH below about 5.0 and containing silica ions, alkali metal ions and $SO_2$ ions in contact with cation exchange material to remove alkali metal ions from said mixture, recovering an acid $SO_2$-containing silica hydrosol solution from the contacting step and removing $SO_2$ as a gas from the silica hydrosol solution and using it as the acid in said first-mentioned acid liquid mixture.

7. A process for the production of silica hydrosol which comprises mixing a solution containing silica and alkali metal ions with an aqueous solution containing $SO_2$ ions to produce an acid mixture having a pH below about 5.0 and containing silica hydrosol and an alkali metal salt of sulfurous acid, passing the resulting acid mixture in contact with cation exchange material to remove alkali metal ions from the mixture and to regenerate sulfurous acid from the alkali metal salt, withdrawing the sulfurous acid-containing silica hydrosol solution from said cation exchange material and passing it to a stripping zone, removing $SO_2$ as a gas from said acid silica hydrosol solution in said stripping zone, recycling the removed and recovered $SO_2$ gas for admixture with additional alkali metal and silica-containing solution and withdrawing substantially pure silica hydrosol from said stripping zone.

References Cited in the file of this patent

UNITED STATES PATENTS

| | | |
|---|---|---|
| 1,715,439 | Van Ness | June 4, 1929 |
| 2,244,325 | Bird | June 3, 1941 |
| 2,386,337 | Moyer | Oct. 9, 1945 |
| 2,386,810 | Marisic et al. | Oct. 16, 1945 |
| 2,588,389 | Iler | Mar. 11, 1952 |
| 2,601,235 | Alexander et al. | June 24, 1952 |

OTHER REFERENCES

Colloid Chemistry, by J. Alexander, vol. VI, Reinhold Publishing Co., pp. 1116–7.